May 21, 1963 R. F. LINDGREN 3,090,213
TORQUE LIMITER
Filed Oct. 13, 1961 2 Sheets-Sheet 1

Inventor:
Robert F Lindgren
By: Hofgren, Brady, Wegner,
Allen & Stellman
Attorneys May 21, 1963  R. F. LINDGREN  3,090,213
TORQUE LIMITER
Filed Oct. 13, 1961  2 Sheets-Sheet 2
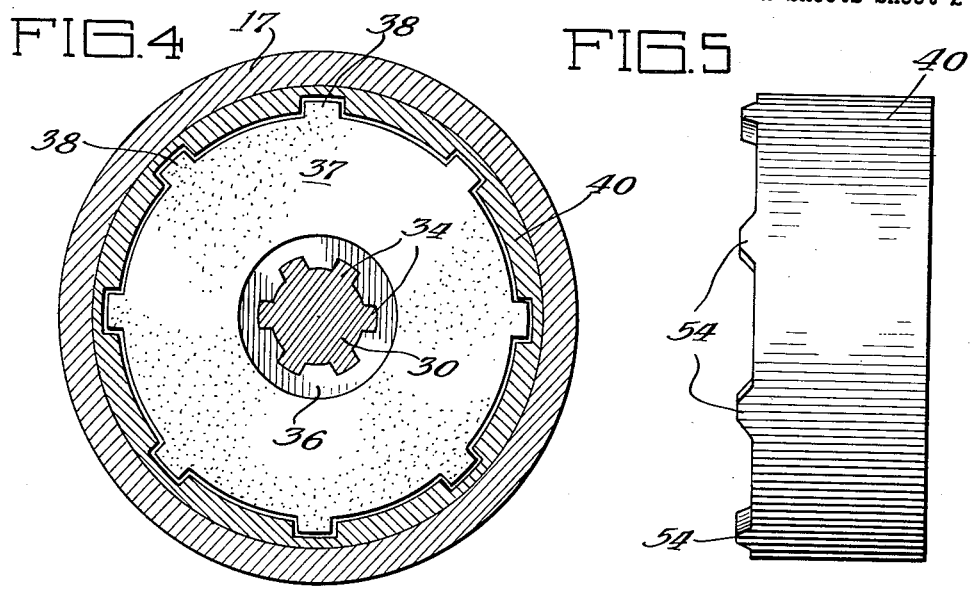
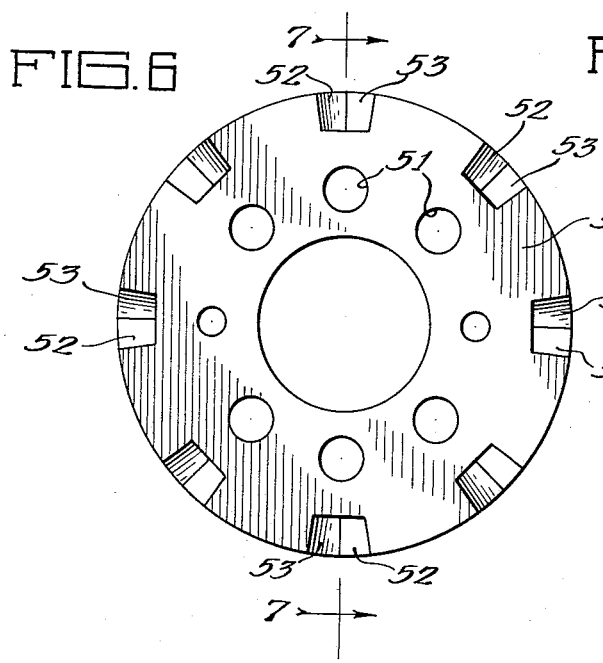

United States Patent Office 3,090,213
Patented May 21, 1963

3,090,213
TORQUE LIMITER
Robert F. Lindgren, Aurora, Ill., assignor to Daco, Incorporated, a corporation of Illinois
Filed Oct. 13, 1961, Ser. No. 144,929
4 Claims. (Cl. 64—30)

This invention relates to a torque limiter, and more particularly to an automatically operated torque limiter incorporating a sensing means to maintain a desired upper limit of torque transmission regardless of ambient conditions.

The torque limiter of this invention is adapted for general application as a coupling between a drive shaft and a driven shaft. The coupling is intended to impart driven torque through a plurality of dry friction plates obtaining the driving forces due to the friction. Ordinarily, many conditions change the amount of torque transmittable through dry friction plates. The coefficient of friction changes radically with the change of moisture condition within the unit. Any impurity, such as oil, dirt or dust, can also affect a change in the friction between the plates. In order that the torque limiter properly operate, the plates should slip and refuse to transmit any torque above the desired maximum. As more slippage occurs, the plates rise to a higher temperature, also affecting the amount of friction between plates and thus the torque transmitted. The present invention involves a torque limiter automatically compensating for all of the various factors tending to change the friction between the driving plates and the torque thus transmitted.

The primary object of this invention is to provide a new and improved torque limiter of the character described.

Another object is to provide a torque limiter which is automatically operative to give a maximum desired torque transmission under all operating conditions.

Another object is to provide a torque limiter incorporating a mechanical linkage arrangement which operates automatically to limit the torque transmitted.

A further object is to provide a new torque limiter device which is operative to deliver a constant desired amount of torque from an input torque of greater amount.

Further objects, features and advantages of the present invention will be apparent from the following description of the preferred embodiment of the invention illustrated in the accompanying drawings, in which:

FIGURE 4 is a sectional view through the device taken substantially along line 4—4 in FIGURE 3;

FIGURE 5 is a side elevational view of the driving sleeve incorporated in the torque limiter;

FIGURE 6 is a plan view of a base plate which has a driving connection with the sleeve of FIGURE 5, and FIGURE 7 is a sectional view through the base plate of FIGURE 6, taken substantially along line 7—7 therein.

Figure 1:
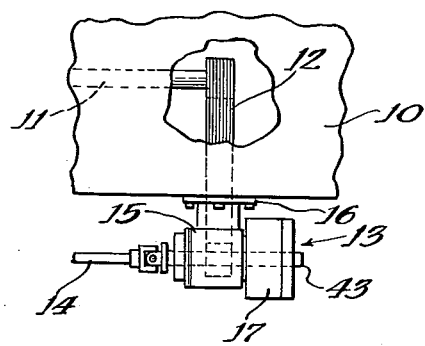
FIGURE 1 is a fragmentary plan view of the torque limiter of this invention installed between an input and output shaft.

While the torque limiter of this invention may be used in any location and with any apparatus where torque should be transmitted from a drive shaft to a driven shaft, the particular embodiment chosen for illustration is used as a part of the drive train to a driven front axle of a utility-sized tractor. Thus, in FIGURE 1 the frame 10 of the tractor has therein a drive shaft 11 with an appropriate sprocket for chains 12 imparting drive to a drive shaft within the torque limiter unit, generally designated 13, so as to transmit torque to the output driven shaft 14. In this embodiment the torque limiter has a stationary frame 15 equipped with a flange 16 for attachment to the frame 10 of the tractor. The internal structure of the torque limiter is illustrated in FIGURES 3 through 7, and generally incorporates a rotating housing 17 within which dry friction plates are incorporated for transmitting the torque from the drive to the driven shaft.

Figure 3:
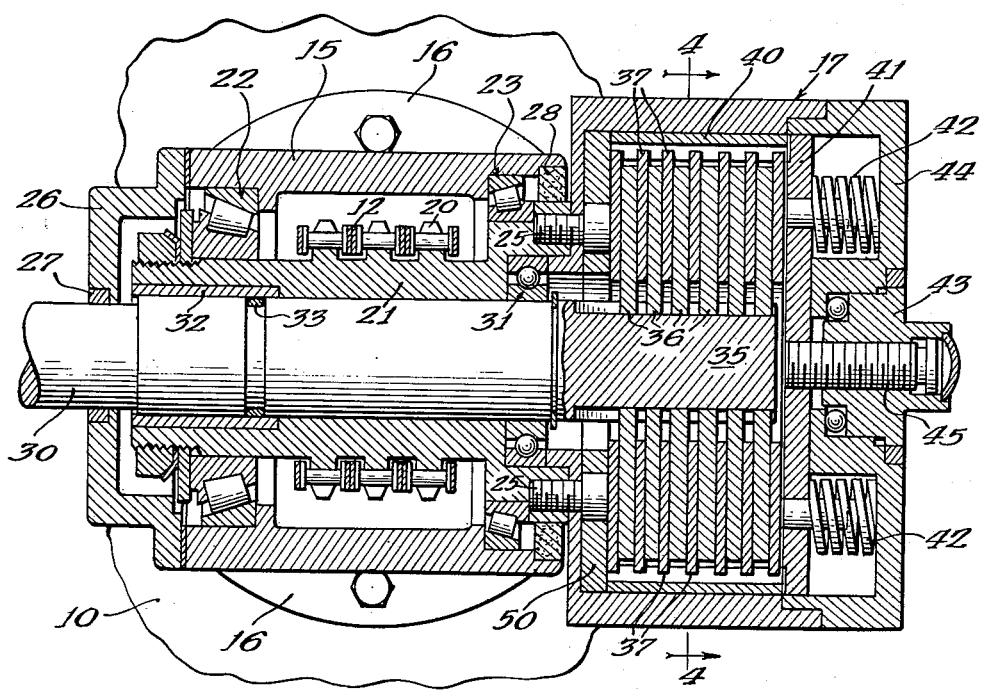
FIGURE 3 is an elevational sectional view through the torque limiter, illustrated in FIGURE 1.

The details of the particular torque limiter are best seen in FIGURE 3. The chain 12 imparts rotary motion to a sprocket 20 formed with an input drive stub shaft 21 suitably supported in bearings 22 and 23 within the housing 15. The rotatable housing 17 is secured to the input shaft 21 by a plurality of machine screws 25 so that the housing will always rotate with the input shaft 21. Adequate seals and closures are provided to maintain the interior of the torque limiter dry within the housing 17, yet allowing an oil bath on the bearings previously described. Thus, a cover 26, with the seal 27 at the left-hand end of FIGURE 3 and a seal at the right-hand end of the stationary housing, is provided.

The output shaft in the particular structure illustrated is mounted within and supported by the input shaft 21. Thus, the output shaft 30 is supported by roller bearing 31 and a sleeve bearing 32 within the hollow input shaft 21. A seal 33 prevents any oil from inside the housing from extending along the surface of the output shaft and into the rotating housing 17. In order that rotary motion from the input shaft be transmitted to the output shaft 30, a stack of friction plates running against each other are provided within the rotating housing 17. Certain of the plates are cast iron, and are placed upon a spline 34 on the inner end 35 of the output shaft. Such plates 36 have an inner periphery to fit loosely upon the spline. Between the plates 36 are driving plates 37 having fingers 38 on their outer periphery to engage in grooves made for that purpose within a sleeve 40. Driving torque from the input shaft 21 is transferred to the driving plates 37 by the sleeve 40. So long as the torque transmitted is less than the maximum intended, there is no slipping between the cast iron plates and the plates 37 which are faced with bronze. Friction between the plates is maintained at a desired level by the application of a pressure plate 41, spring urged by a plurality of springs 42, against the stack of plates. A nut 43 threaded in the cover 44 on the housing 17 is equipped for threaded turning on a stud 45 to lift the pressure plate 41 from the stack of plates. It is recommended that the pressure of the pressure plate be removed from the stack of friction plates whenever the unit is to sit idle for a prolonged period of time. The nut 43 is provided for this purpose.

Figure 2:
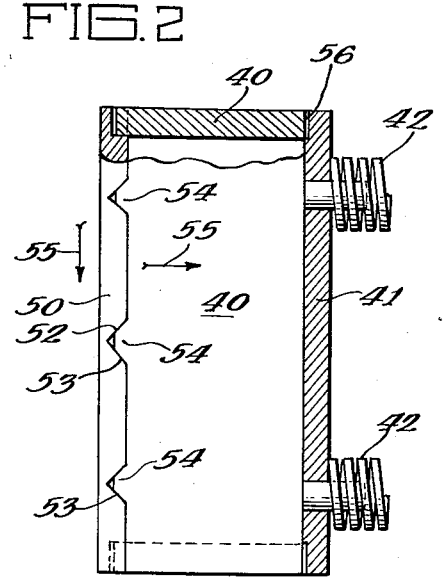
FIGURE 2 is a diagrammatic elevational view partially in section and partially broken away of the operative elements of the invention in position for illustrating their operation.

The drive through the torque limiter is arranged with mechanical components which will automatically prevent a delivery of more torque than is desired to the output shaft 30. At the same time, a maximum amount of torque may be taken from a larger input so that there is available at the output shaft 30 no less than the maximum torque desired. The structure by which the delivery of torque is accomplished includes the driving sleeve 40 and a driving plate 50 against which the stack of plates is urged within the housing 17. The driving plate 50 is equipped with enlarged openings 51 which embrace the head of the machine screws 25 so that rotary motion of the plate is the same as that of the housing 17. On the periphery of the plate 50 there are located a number of cam surfaces arranged in pairs 52 and 53, facing each other and including an angle between each pair of approximately 90°. Each cam surface 52 and 53 is at a 45° angle to the longitudinal center line of the output shaft 30. The driving sleeve is equipped with a number of bosses 54, one for each pair of cam faces in the driving plate. As can be seen in the diagrammatic view of FIGURE 2, the plate 50 is given rotary motion in the direction of the arrow 55. This rotary motion is also supplied to the drive sleeve 40 due to the fact that the bosses 54 extend into recesses, formed between the cam faces 52 and 53. The opposite end 56 of the sleeve 40 bears against the pressure plate 41 and may lift the plate against the action of the springs 42 by the camming action between the faces 52 and the mating bosses 54, previously described. In operation, when the resistance to rotary motion supplied to the sleeve by the plates 37 rises to a sufficiently high value, the sleeve is cammed longitudinally to reduce the pressure of the pressure plate on the stack of dry friction plates. The sleeve senses the amount of torque being delivered to the output shaft 30 and, responsive thereto, decreases the pressure of the pressure plate 41 on the stack of plates to an amount whereby only a desired maximum torque is transmitted. The drive plate and drive sleeve operate as a constant sensing or throttling mechanism which takes into account all variables in the friction between the driving plates and limits the torque transmitted to a desired maximum. Large impact loads will be immediately released so that the maximum torque will not be exceeded.

The entire input shaft torque is delivered through the cam faces 52 to the bosses 54 on sleeve 40. The resistance of the friction plates 37 to rotate acts also on the sleeve 40, varying the tendency of the sleeve to move longitudinally in the direction of arrow 55 (FIG. 2), which movement is resisted by the spring-pressed pressure plate acting against the sleeve. A balance is obtained by which the sleeve will always deliver torque to the friction plates up to a desired maximum. Excessive torque is used in releasing the pressure of the pressure plate upon the stack of friction plates automatically governing the total output torque to shaft 30. The operation of the torque limiter through the interaction of the elements depicted in FIGURE 2 of the drawings, is such that the output torque in the output shaft 30 may, for example, be about 600 foot-pounds for a front driving axle of a utility-sized tractor. The input torque delivered to the stub shaft in the torque limiter may be greater than 600 foot-pounds, by a small amount or may be considerably greater. In either event, the slipping of the dry friction plates is only sufficient to prevent any excess of the 600 foot-pounds from being delivered to the output shaft. The friction will be sufficient to insure that even through slipping, the plates delivered to the output shaft will be the desired 600 foot-pounds. In different applications, the desired amount of torque may be varied to other maximum amounts. Changes in the number of plates, the strength of the springs and the angles of the cam surfaces all may change the maximum torque delivered.

Another advantage of the present unit results is much less variation in the maximum torque setting due to wear on the friction plates. The pressure plate follows against the stack of pressure plates and as wear occurs, the springs pushing the pressure plate extend further. In a unit not having the sleeve 40, a variation occurs in the torque output due to the variation of pressure on the stack of friction plates. In this invention however, the spring pressure was much greater at the beginning, reduced by the thrust of the sleeve 40 to reach a maximum desired pressure on the stack of friction plates with the result that wear on the plates affects the maximum torque output to a much lesser degree.

The foregoing detailed description has been given for clearness of understanding only and no unnecessary limitations should be understood therefrom as some modifications will be obvious to those skilled in the art.

I claim:
1. A torque limiter for a drive train, comprising: an input drive shaft and an output driven shaft, friction plates in driving contact providing a torque transmitting coupling between the shafts, a pressure plate resiliently urging said friction plates into said driving relation, a driving sleeve about the friction plates having a driving connection with some of the plates, said sleeve and input drive shaft having engaging cam surfaces therebetween for driving the sleeve in rotation and urging said sleeve toward said pressure plate in a direction to relieve said resilient urging of the friction plates together, said sleeve sensing torque transmitted by said friction plates and being urged by said engaging cam surfaces in response to the sensed torque to relieve pressure of the pressure plate on said friction plates maintaining torque transmitted to the output shaft below a predetermined maximum.

2. A torque limiter for a drive train, comprising: an input drive member and an output driven member, a coupling between said members including engaging friction plates, urging means yieldably urging said friction plates into engagement with each other, a driving sleeve about the plates connected to at least one of the friction plates and to the input member for transmission of torque therebetween, said input member and driving sleeve having cam surfaces therebetween for rotating the sleeve and urging the sleeve longitudinally thereof, said sleeve sensing the torque transmitted to said friction plates and being movable by said cam surfaces in opposition to said urging means whereby to relieve pressure on the friction plates automatically limiting maximum torque transmittable through the friction plates.

3. A torque limiter for a drive train, comprising: an input driving member and an output driven member, friction driving plates coupling said members for flexible torque transmission between the members, a pressure plate resiliently urging said friction plates into driving contact, a driving sleeve about the friction plates having a lost motion connection with some of said plates, cam surfaces between the input member and driving sleeve for imparting rotary and longitudinal motion to said sleeve, said sleeve rotatry motion being imparted through said lost motion connection to said friction plates and said sleeve longitudinal motion being arranged in opposition to said pressure plate to relieve pressure of the latter on said friction plates, said sleeve sensing the torque transmitted by the friction plates and being moved longitudinally in response to the sensed torque to decrease the pressure of said pressure plate on said friction plates to limit torque so transmitted to a predetermined maximum.

4. A torque limiter for a drive train, comprising: an input drive shaft and an output driven shaft, friction plates in driving contact providing a torque transmitting coupling between the shafts, a pressure plate resiliently urging said friction plates into said driving relation, a driving member having a driving connection with some of the plates, said driving member and input drive shaft having engaging cam surfaces therebetween for driving the driving member in rotation and urging said driving member toward said pressure plate in a direction to relieve said resilient urging of the friction plates together, said driving member sensing torque transmitted by said friction plates and being urged by said engaging cam surfaces in response to the sensed torque to relieve pressure of the pressure plate on said friction plates maintaining torque transmitted to the output shaft below a predetermined maximum.

References Cited in the file of this patent

UNITED STATES PATENTS

| | | |
|---|---|---|
| 2,587,712 | Dodge | Mar. 4, 1952 |
| 2,727,372 | Haerther | Dec. 20, 1955 |

FOREIGN PATENTS

| | | |
|---|---|---|
| 430,562 | Germany | June 19, 1926 |